United States Patent Office 2,743,277
Patented Apr. 24, 1956

2,743,277

PYRIDINE GLYCOLS AND PROCESS OF MAKING THEM

Francis E. Cislak, Indianapolis, Ind., assignor to Reilly Tar & Chemical Corporation, Indianapolis, Ind., a corporation of Indiana No Drawing. Application September 1, 1954, Serial No. 453,683

10 Claims. (Cl. 260—297)

This invention relates to pyridine glycols and to the process of preparing them. More particularly, it relates to 2-pyridylglycols and to 4-pyridylglycols which compounds may be represented by the following formulae:

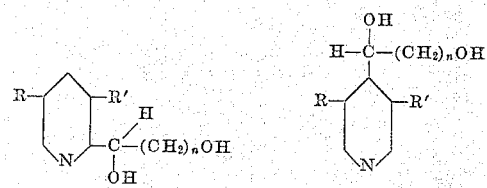

where $n$ is 1 to 3 and R and R' are hydrogen or alkyl.

The pyridylglycols of my invention are useful in the manufacture of certain types of synthetic fibers. One of the newer and more acceptable synthetic fibers, Dacron, is a polyester of terephthalic acid and ethylene glycol. The dyeing of Dacron type fibers has not heretofore been solved. Attempts have been made to achieve the penetration of the closely packed molecular chains by the use of carriers, by dyeing at high temperatures, or by forming the final dye molecule within the fiber. By the use of a small percentage (3% to 7%) of pyridylglycols in the molecular make-up of the polyesters, the dyeing properties are greatly enhanced. The presence of the pyridine ring nitrogen in the resin molecule furnishes a point of attachment for acid dyes, thereby enabling the fibers to be dyed in the usual manner. The degree of the dye absorption depends upon the number of pyridine ring nitrogens present in the resin molecule.

In recent years several polyester resins have achieved industrial stature. Noteworthy is the use of glass fiber reinforced polyesters for the manufacture of automobile bodies. It is recognized that the usefulness of the resins in automobile bodies depends upon the ability to bond the glass fiber reinforcement to the polyester resin. The incorporation of pyridylglycols into the molecular make-up of the polyester resins increases the bond of the resins to the glass fibers.

A pyridyl glycol, 2-(2-pyridyl)propandiol 1:3, may be formed by the condensation of 2-picoline with formaldehyde. The yield of this glycol is very small, the main product of the reaction is 2-pyridylethanol. Attempts to increase the yield of the glycol have invariably resulted in the formation of a tarry mass instead of the desired 2-pyridylpropandiol 1:3.

While I have not succeeded in improving the process of making 2-(2-pyridyl)propandiol 1:3, I have discovered a way of preparing 1-(2-pyridyl)propandiol 1:3 as well as other pyridylglycols. I have found that if I heat, for example, 2-propan-3-olpyridine-N-oxide with an organic acid anhydride and hydrolyze the resulting product, I obtain in good yield a pyridylglycol, such, for example, as 1-(2-pyridyl)propandiol 1:3.

A convenient way of carrying out my invention is illustrated in the following specific examples. The alkanolpyridine-N-oxides are new compounds, they are the subject of my co-pending patent application Serial No. 435,689 filed even date herewith.

The alkanolpyridine-N-oxides may be prepared by oxidizing at about 75–85° C. an acetic acid solution of an alkanolpyridine acetate with hydrogen peroxide, distilling off the water and most of the acetic acid, refluxing the distillation residue with an excess of aqueous caustic soda solution, extracting the alkanolpyridine-N-oxide from the caustic solution with benzene and then evaporating the benzene to obtain the alkanolpyridine-N-oxide.

EXAMPLE 1

1-(2-pyridyl)propandiol 1:3

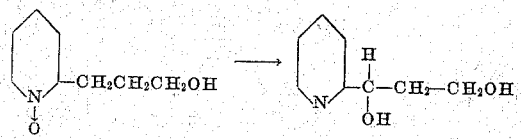

To 250–300 pounds of refluxing acetic anhydride add 150 pounds of 2-propan-3-olpyridine-N-oxide. The addition should be made in small portions as considerable heat is evolved by the reaction of the 2-propanolpyridine-N-oxide with the acetic anhydride. When all of the N-oxide has been added, the resulting solution is maintained at refluxing temperature for about two hours. Then the solution is subjected to vacuum distillation to remove the unreacted acetic anhydride. To the residue remaining after the acetic anhydride has been removed, there is added about 750–1,000 parts of an aqueous caustic soda solution. The resulting mixture is heated at reflux conditions for about four to six hours. Then the mixture is cooled and thoroughly extracted with about 350 to 500 parts of diethyl ether. The ether extract contains the 1-(2-pyridyl)propandiol 1:3 which was found during the preceding reaction. The ether solution is dried and then the ether is removed by vacuum distillation. There remains an oily residue of 1-(2-pyridyl)propandiol 1:3.

EXAMPLE 2

1-(2-pyridyl)ethandiol 1:2

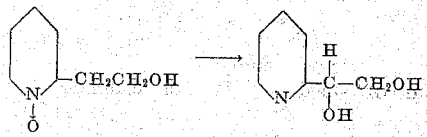

The process of Example 1 is repeated save that 130 pounds of 2-ethan-2-olpyridine-N-oxide are used instead of the 150 pounds of 2-propan-3-olpyridine-N-oxide used in Example 1. The product formed is 1-(2-pyridyl)ethandiol 1:2.

EXAMPLE 3

1-(4-pyridyl)propandiol 1:3

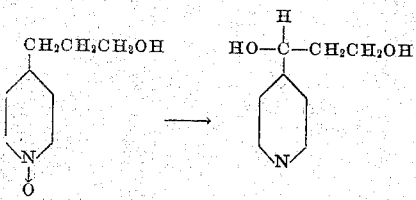

To about 600 pounds of hot (95–100° C.) acetic anhydride there is added, in small portions, about 150 pounds of 4-propan-3-olpyridine-N-oxide. After the addition is complete, the resulting solution is maintained at about 100° C. for two to three hours. The 1-(4-pyridyl)propandiol 1:3 formed during the reaction is recovered from the acetic anhydride solution in any convenient manner.

One convenient way of recovering the 1-(4-pyridyl)-propandiol 1:3 is as follows: The acetic anhydride is removed by distillation under vacuum. To the residue remaining after the acetic anhydride is removed, is added about 750 pounds of a 10% aqueous caustic soda solution. The resulting solution is heated at reflux conditions for about four to six hours. The solution is concentrated by evaporating off the water under vacuum. The residue is then extracted with about 500 pounds of hot xylene. The xylene extract, which contains the 1-(4-pyridyl)-propandiol 1:3, is subjected to vacuum distillation to remove the xylene. The residue is the 1-(4-pyridyl)-propandiol 1:3. The yield of this glycol is not as high as was that of the 1-(2-pyridyl)propandiol 1:3.

EXAMPLE 4

*1-(2-pyridyl)butandiol 1:4*

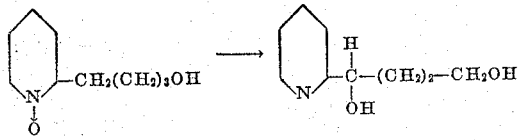

The process of Examples 1 and 3 is repeated save that 2-butan-4-olpyridine-N-oxide is used in place of the 2-propan-3-olpyridine-N-oxide of Example 1 and of the 4-propan-3-olpyridine-N-oxide of Example 3. The product recovered is 1-(2-pyridyl)butandiol 1:4.

EXAMPLE 5

*1-(2-5-ethylpyridyl)ethandiol 1:2*

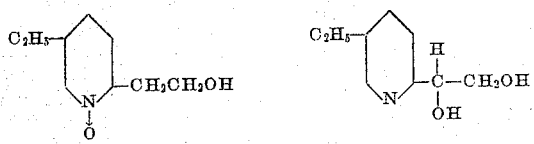

The process of Examples 1 and 3 is repeated save that 5-ethyl-2-ethan-2-olpyridine-N-oxide is used in place of the 2-propan-3-olpyridine-N-oxide of Example 1 and the 4-propan-3-olpyridine-N-oxide of Example 3. The product recovered is 1-(2-5-ethylpyridyl)ethandiol 1:2.

For reasons of economy I prefer to use acetic anhydride in conducting my reaction. I may, however, use other organic acid anhydrides, such as propionic acid anhydride, or benzoic acid anhydride.

Instead of starting with, for example 2-propan-3-olpyridine-N-oxide, I may start with 2-propan-3-olpyridine and make the 1-(2-pyridyl)propandiol 1:3. As an example of preparing a pyridylglycol directly from an alkanol-pyridine, I cite the following:

EXAMPLE 6

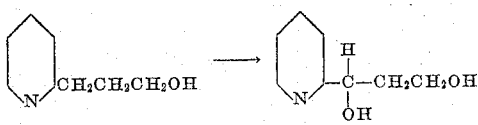

A solution of 150 pounds of 2-propan-3-olpyridine and about 280 parts of glacial acetic acid is heated to a reflux temperature for about four hours. The solution is then cooled to a temperature of about 75° C. and 210 parts of hydrogen peroxide (35% H2O2) is added. The hydrogen peroxide is preferably added in small portions during a four hour period. The temperature of the solution is maintained at 75° C. during the addition of the hydrogen peroxide. After all of the hydrogen peroxide has been added the solution is maintained at the elevated temperature for an additional 16–20 hours. Then the solution is heated to about 95° C. and about 18 parts of paraformaldehyde is added. The paraformaldehyde is added to destroy any unreacted peroxide. The peroxide free solution is concentrated by distilling off the water and most of the acetic acid. The concentration is carried out under vacuum (30–75 mm. Hg) and is discontinued when no more distillate is obtained and the temperature of the liquid reaches about 95–100° C. The concentrated reaction mixture is added, in small portions, to 600 parts of hot (95–100° C.) acetic anhydride. The resulting solution is maintained at 95–100° C. for about two hours. The resultant 1-(2-pyridyl)propandiol 1:3 is recovered from the acetic anhydride solution in any suitable manner, as for example, by the procedure of Example 1 above.

I claim as my invention:

1. The process of preparing compounds of the class consisting of 2-pyridylglycols and 4-pyridylglycols having the following general formulae:

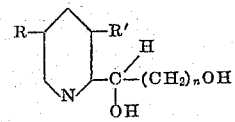

and

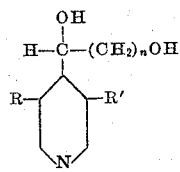

where $n$ is 1 to 3 and R and R' are selected from the class consisting of hydrogen, methyl and ethyl, which comprises reacting at an elevated temperature a mixture of a monocarboxylic organic acid anhydride and a compound of the class consisting of 2-pyridylalkanol-N-oxides and 4-pyridylalkanol-N-oxides having the following general formulae:

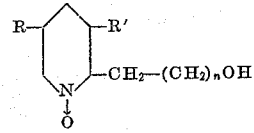

and

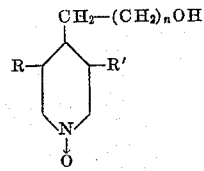

where $n$ is 1 to 3 and R and R' are selected from the class consisting of hydrogen, methyl and ethyl and recovering the pyridylglycol from the reaction mixture.

2. The process of preparing 1-(2-pyridyl)propandiol 1:3 which comprises reacting 2-propan-3-olpyridine-N-oxide with acetic anhydride and recovering the 1-(2-pyridyl)propandiol 1:3.

3. The process of preparing 1-(2-pyridyl)ethandiol 1:2 which comprises reacting 2-ethan-2-olpyridine-N-oxide with acetic anhydride and recovering 1-(2-pyridyl)-ethandiol 1:2.

4. The process of preparing 1-(4-pyridyl)propandiol 1:3 which comprises reacting 4-propan-3-olpyridine-N-oxide with acetic anhydride and recovering the 1-(4-pyridyl)propandiol 1:3.

5. The process of preparing 1-(4-pyridyl)ethandiol 1:2 which comprises reacting 4-ethan-2-olpyridine-N-oxide with acetic anhydride and recovering the 1-(4-pyridyl)ethandiol 1:2.

6. Compounds of the class consisting of 2-pyridylglycols and 4-pyridylglycols having the following general formulae:

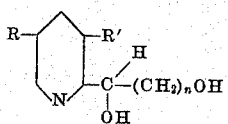

and

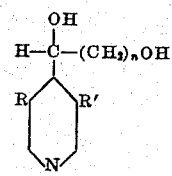

where $n$ is 1 to 3 and R and R' are selected from the class consisting of hydrogen, methyl and ethyl.
7. The compound 1-(2-pyridyl)propandiol 1:3.
8. The compound 1-(2-pyridyl)ethandiol 1:2.
9. The compound 1-(2-pyridyl)butandiol 1:4.
10. The compound 1-(4-pyridyl)propandiol 1:3.

References Cited in the file of this patent
UNITED STATES PATENTS
2,512,660   Mahan _____ June 27, 1950